UNITED STATES PATENT OFFICE 2,531,423

BIS-(CARBOXYDIPHENYLAMINE)-SULFIDES AND SULFONES

Alan August Goldberg, Somerset, and Harold Silas Turner, Manchester, England, assignors to Ward, Blenkinsop & Company Limited, London, England, a British company No Drawing. Application October 24, 1947, Serial No. 782,013. In Great Britain August 23, 1946

3 Claims. (Cl. 260—397.6)

This invention relates to bis-(diphenylamine 2-carboxylic acid) derivatives having the general formula

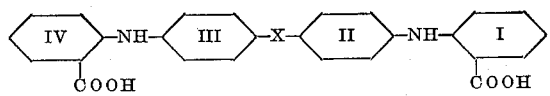

in which X is a sulphide or a sulphone group, the sulphur atom of X being directly linked to a nuclear carbon atom of each of the phenyl residues II and III. More particularly, the invention relates to the new 4:4'-bis-(2''-carboxyphenylamino) diphenyl sulphide and sulphone and to the production thereof.

According to the present invention, there are provided products of pharmacological value having the aforesaid general formula.

According to the present invention, a process for the production of a compound having the above general formula comprises reacting the corresponding p-p'-diaminodiphenyl sulphide or sulphone with an ortho-halogenobenzoic acid.

The reaction is preferably carried out in a suitable solvent in the presence of an acid acceptor and a catalyst. Preferred acid acceptors are the alkali metal carbonates such as potassium carbonate in excess over that required for salt formation and a preferred catalyst is copper powder. Other sources of copper such as copper salts may also be used. A suitable solvent is one which dissolves or partially dissolves one or both of the reactants and preferred solvents are butyl or amyl alcohols.

In carrying out the process of the invention a convenient procedure is to heat the reactants, the catalyst, the acid acceptor and the solvent together, to remove the solvent by suitable means such as by addition of water and distillation in steam and to acidify the resulting aqueous solution of the formed dialkali metal salt of the product with mineral acid in order to precipitate the required product. It is advantageous to stir the reaction mixture and to operate at the boiling point of the solvent employed in order to obtain efficient mixing. In certains cases, for example, when one reactant is a sulphide, it is desirable to carry out the reaction in the presence of an inert atmosphere, such as an atmosphere of nitrogen in order to avoid oxidation by atmospheric oxygen.

The products obtained in accordance with the invention are of considerable pharmaceutical interest. The new sulphone has valuable antibacterial properties of the kind encountered with p.p'-diaminodiphenyl sulphone but it is more soluble and of lower toxicity. The products have been found to possess high antitubercle activity.

The following examples illustrate the manner in which the invention may be carried into effect:

Example 1

41 gms. of 4:4'-diaminodiphenylsulphone, 26 gms. of o-chlorobenzoic acid, 29 gms. of potassium carbonate and a trace of copper powder are heated under reflux in 200 ccs. of amyl alcohol in an oil bath for 3 hours. The reaction mixture is cooled and the amyl alcohol removed by distillation in steam. The residual aqueous solution is filtered with charcoal, acidified, and the precipitate redissolved in 2.5 litres of water by addition of the minimal necessary amount of sodium hydroxide solution. This solution is boiled with charcoal, filtered and the acid precipitated by addition of dilute hydrochloric acid to the boiling solution. The reprecipitation process is repeated and the green powder thus obtained extracted with 60 ccs. of boiling alcohol, the extract filtered with charcoal and finally evaporated to small volume; on cooling 4:4'-bis-(2''-carboxyphenylamino)diphenylsulphone separates in fawn prisms m.pt. 258–260° C.

Example 2

108 gms. of p:p'-diaminodiphenylsulphide, 156 gms. of o-chlorobenzoic acid, 152 gms. of potassium carbonate and a trace of copper powder are heated with 1 litre of amyl alcohol in an atmosphere of nitrogen at atmospheric pressure in an oil bath at 140° C. for 2 hours. The amyl alcohol is removed by distillation in steam, the residual aqueous solution diluted to 6 litres, boiled with charcoal, filtered, acidified at the boiling point and the green precipitate collected. This is then redissolved in 5 litres of water containing 70 gms. of potassium carbonate, the solution filtered with charcoal and reprecipitated as before. The dried light green solid (151 g.) is boiled with alcohol, filtered to remove insoluble blue impurity therefrom and the filtrate refluxed with charcoal and filtered. The solvent is distilled off until its volume is reduced to about 2.5 litres: on cooling, 4:4'-bis-(2''-carboxyphenylamino) diphenylsulphide separates as a yellow crystalline powder m.pt. 256–258° C. (decomp.) (found: M.230.5. $C_{26}H_{20}O_4N_2S$ requires M.228).

We claim:

1. As a new product a bis-(diphenylamine 2-carboxylic acid) derivative having the general formula

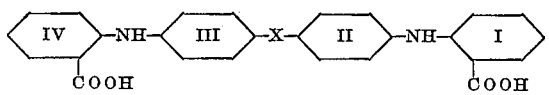

in which X is a selected from the group consisting of sulphide and sulphone groups, the sulphur atom of X being directly linked to a nuclear carbon atom of each of the phenyl residues II and III.

2. 4:4'-bis-(2''-carboxyphenylamino) diphenylsulphone.

3. 4:4'-bis-(2''-carboxyphenylamino) diphenylsulphide.

ALAN AUGUST GOLDBERG.
HAROLD SILAS TURNER.

REFERENCES CITED

The following references are of record in the file of this patent:

UNITED STATES PATENTS

| Number | Name | Date |
|---|---|---|
| 2,003,842 | Spiegler | June 4, 1935 |
| 2,151,543 | Zerweck et al. | Mar. 21, 1936 |

OTHER REFERENCES

Chemical Abstracts, vol. 26 (1932), page 2184 (Abstract of Sergeev, "J. Gen. Chem.," U. S. S. R., vol. 1 (1931), pp. 279–288.